United States Patent
Cornea-Hasegan

(10) Patent No.: US 8,126,954 B2
(45) Date of Patent: Feb. 28, 2012

(54) METHOD AND SYSTEM FOR AVOIDING UNDERFLOW IN A FLOATING-POINT OPERATION

(75) Inventor: Marius A. Cornea-Hasegan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 12/533,800

(22) Filed: Jul. 31, 2009

(65) Prior Publication Data

US 2009/0292754 A1    Nov. 26, 2009

Related U.S. Application Data

(63) Continuation of application No. 10/328,572, filed on Dec. 23, 2002, now Pat. No. 7,593,977.

(51) Int. Cl.
*G06F 7/483* (2006.01)
(52) U.S. Cl. .......... 708/498; 708/553
(58) Field of Classification Search ............ None
See application file for complete search history.

(56) References Cited

U.S. PATENT DOCUMENTS

| | | | |
|---|---|---|---|
| 4,647,401 A | 3/1987 | Gradeff et al. | |
| 5,257,216 A | 10/1993 | Sweedler | |
| 5,548,545 A | 8/1996 | Brashears et al. | |
| 5,550,767 A | 8/1996 | Taborn et al. | |
| 5,886,915 A | 3/1999 | Sharangpani et al. | |
| 5,892,697 A | 4/1999 | Brakefield | |
| 6,105,047 A | 8/2000 | Sharangpani et al. | |
| 6,571,265 B1 | 5/2003 | Story | |
| 6,631,392 B1 | 10/2003 | Jiang et al. | |
| 6,633,895 B1 | 10/2003 | Bass et al. | |
| 6,963,894 B2 * | 11/2005 | Cornea-Hasegan | 708/498 |
| 6,993,549 B2 | 1/2006 | Steele, Jr. | |
| 7,272,623 B2 | 9/2007 | Cornea-Hasegan | |
| 2002/0194239 A1 * | 12/2002 | Pangal | 708/498 |
| 2004/0059769 A1 * | 3/2004 | Cornea-Hasegan | 708/498 |
| 2004/0225703 A1 * | 11/2004 | Pangal | 708/498 |
| 2006/0031271 A1 | 2/2006 | Cornea-Hasegan | |
| 2009/0292754 A1 * | 11/2009 | Cornea-Hasegan | 708/498 |

OTHER PUBLICATIONS

Cornea-Hasegan, Marius A., "Correctness Proofs Outline for Newton-Raphson Based Floating-Point Divide and Square Root Algorithms," Proceedings of the 14th IEEE Symposium on Computer Arithmetic, Apr. 14-16, 1999 (pp. 96-105).

(Continued)

*Primary Examiner* — David H Malzahn
(74) *Attorney, Agent, or Firm* — Hanley, Flight and Zimmerman, LLC

(57) ABSTRACT

Methods and systems for detecting underflow in a floating-point operation are disclosed. In accordance with an example disclosed method a plurality of comparator circuits and a plurality of logic devices coupled to the plurality of comparator circuits are operated to determine whether performing a floating-point operation using a floating-point hardware unit will generate an underflow condition. The operating of the plurality of comparator circuits and the logic devices involves inputting a multiply-add operation result value to at least some of the plurality of comparator circuits. In addition, a plurality of logic outputs are outputted via the plurality of logic devices. The plurality of logic outputs are indicative of comparison operations performed by at least some of the comparator circuits based on the multiply-add operation result value. An underflow indicator is outputted based on the plurality of logic outputs. The underflow indicator is indicative of whether performing the floating-point operation using the floating-point hardware unit will generate the underflow condition.

38 Claims, 6 Drawing Sheets

OTHER PUBLICATIONS

Hollasch, Steve, "IEEE Standard 754 Floating Point Numbers," updated Dec. 4, 2001, [retrieved from http://research.microsoft.com/~hollasch/cgindex/coding/ieeefloat.html] (7 pages).

Intel Itanium Architecture Software Developer's Manual, vol. 1: Application Architecture, Revision 2.0, Document No. 245317-003, pp. i-xii, 1:1-1:8, 1:77-1:102, 1:129-1:130, 1:193-1:206, and Index-1 to Index-12 (Dec. 2001).

Intel Itanium Architecture Software Developer's Manual, vol. 2: System Architecture, Revision 2.0, Document No. 245318-003, pp. i-xviii, 2:1-2:8, 2:371-2:374, 2:451-2:456, and Index-1 to Index-12 (Dec. 2001).

Intel Itanium Architecture Software Developer's Manual, vol. 3: Instruction Set Reference, Revision 2.0, Document No. 245319-003, pp. i-xii, 3:1-3:8, 3:71, 3:79-3:80, 3:83, and Index-1 to Index-12 (Dec. 2001).

Intel® IA-64 Architecture Software Developer's Manual, vol. 1: IA-64 Application Architecture, Revision 1.1, Document No. 245317-002, pp. 5.1-5.24 (Jul. 2000).

\* cited by examiner

METHOD AND SYSTEM FOR AVOIDING UNDERFLOW IN A FLOATING-POINT OPERATION

RELATED APPLICATIONS

This Patent is a continuation of prior U.S. patent application Ser. No. 10/328,572, filed Dec. 23, 2002, now U.S. Pat. No. 7,593,977, which is hereby incorporated by reference herein in its entirety. In addition, this Patent is related to the U.S. patent application by the same inventor, entitled "Methods and Apparatus for Predicting an Underflow Condition Associated with a Floating-Point Multiply-Add Operation", filed Apr. 8, 2002, and assigned Ser. No. 10/118,348, and that issued as U.S. Pat. No. 6,963,894 on Nov. 8, 2005.

FIELD OF THE DISCLOSURE

The present disclosure relates generally to microprocessor systems, and more specifically to microprocessor systems capable of floating-point operations.

BACKGROUND

Microprocessors are frequently required to perform mathematical operations using floating-point numbers. Often, a specialized hardware circuit (i.e., a floating-point hardware unit) is included in the microprocessor (or electrically coupled to the microprocessor) to perform floating-point operations that have three operands, such as the multiply-add operations. By using a floating-point unit, such floating-point operations may be performed faster than if they were performed in software, and the software execution unit of the microprocessor would then be free to execute other operations.

However, when floating-point numbers are used in mathematical operations, the result of the operation may be too large or too small to be represented by the floating-point unit. When the result is too large to be represented by the floating-point unit, an "overflow" condition occurs. When the result is too small to be represented by the floating-point unit, an "underflow" condition occurs, and the result is said to be "tiny". In either case (overflow or underflow), a software routine must be executed to perform the operation if accurate results are required. In such an instance, the system may be burdened by the overhead of both the execution time of the floating-point unit and the execution time of the software routine even though only a single floating-point operation is being performed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for a processor to determine whether or not an expected result from a floating-point operation will be tiny. This knowledge will permit the floating-point operation to be performed using floating-point hardware rather than software in many cases. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Figure 1:
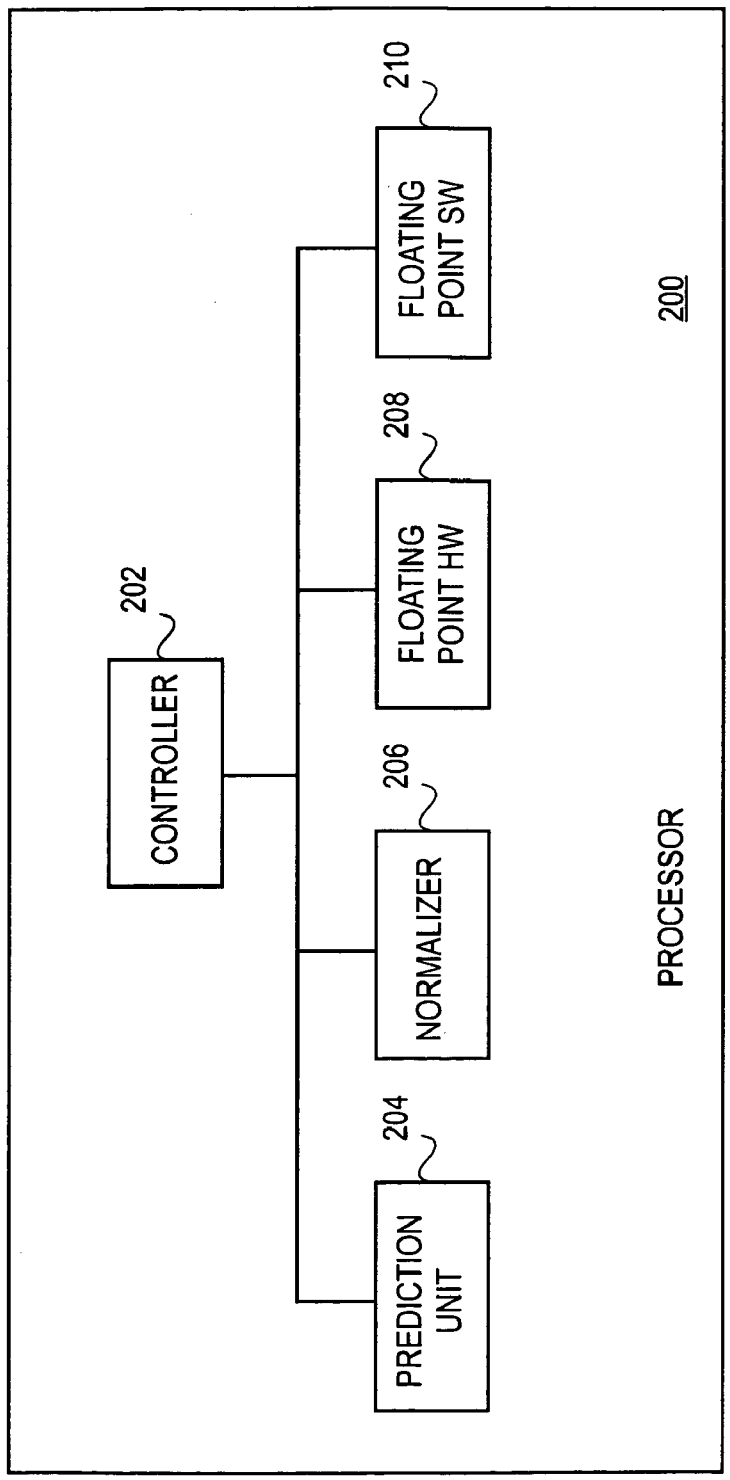
FIG. 1 is a schematic diagram of a processor, according to one embodiment.

Referring now to FIG. 1, a schematic diagram of a processor 200 is shown. In one embodiment, the processor 200 includes a controller 202, a prediction unit 204, a normalizer 206, a floating-point hardware unit 208, and in some embodiments, a floating-point software unit 210. The floating-point hardware unit 208 may be implemented by conventional electronic circuitry in a well-known manner. The floating-point software module 210 may be executed by a microprocessor executing software instructions from internal cache memory or in external system memory. The controller 202, the prediction unit 204, and the normalizer 206 may be implemented by a microprocessor executing software instructions and/or conventional electronic circuitry. However, in one embodiment prediction unit 204 may be implemented in hardware logic. In addition, a person of ordinary skill in the art will readily appreciate that certain modules may be combined or divided according to customary design constraints. Still further, one or more of these modules 202-208 may be located external to the processor 200.

For the purpose of controlling the interaction of the prediction unit 204, the normalizer 206, the floating-point hardware unit 208, and the floating-point software unit 210, the CPU 104 includes a controller 202. The controller 202 is operatively coupled to the prediction unit 204, the normalizer 206, the floating-point hardware unit 208, and the floating-point software unit 210 in a well-known manner. For example, one set of software instructions may be operatively coupled to another set of software instructions via a subroutine call, parameter passing, and/or shared memory location(s). In another example, one piece of electronic circuitry may be operatively coupled to another piece of electronic circuitry via electrical signal line(s) such as a bus. In yet another example, a set of software instructions may be operatively coupled to a piece of electronic circuitry via electrical signal line(s) stimulated by a microprocessor executing the software instructions.

For the purpose of predicting an underflow condition associated with a floating-point operation with three operands, a, b, and c, the processor 200 may include a prediction unit 204. An example of such a floating-point operation is floating-point multiply-add, where the result d=a+b*c. The prediction unit 204 may be implemented in hardware (as discussed below in connection with FIG. 3) or in software (as discussed below in connection with FIG. 4). The prediction unit 204 is structured to assert an output signal indicative of the absence of an underflow condition (the result d is not tiny). Conversely, the same prediction unit 204 is also structured to assert an output signal indicative of a possible underflow condition (the result d might be tiny). In other words, the logic level of the output signal is not material as long as subsequent circuit(s) and/or software routine(s) are structured using the same logical convention.

Floating-point numbers are represented in scientific notation (e.g., $1.01 \times 2^3$). Accordingly, a floating number includes a sign (e.g., positive), a significand (e.g., 1.01), a base (e.g., 2) and an exponent (e.g., 3). In a binary floating-point system, a sign bit of '0' denotes a positive value and a sign bit of '1' denotes a negative value. In a binary system, a base of 2 is presumed and not stored. In many binary floating-point systems, numbers are stored and/or manipulated in 'normalized' form (i.e., the radix point is located immediately after the first non-zero digit). In such an instance, a leading '1' may be presumed and not stored (e.g., as in IEEE Standard for Binary Floating-Point Arithmetic-ANSI/IEEE Standard 754-1985). For the purpose of consistent nomenclature in the present application, the value of the exponent of a floating-point number X will be written "eX".

When floating-point numbers are used in mathematical operations, the result of the operation may be too large or too small to be represented by the floating-point system. When the result is too large to be represented by the floating-point system, an 'overflow' condition occurs. When the result is too small to be represented by the floating-point system, an 'underflow' condition occurs. Underflow conditions occur when the exponent of the result is beyond the minimum value (e.g., −127 for single-precision and −1023 for double-precision). When this happens, it may be said that the result is "tiny".

In this case, the floating-point multiply-add operation operates on three floating-point numbers (e.g., a+b*c). In such an instance, the operation includes a first operand exponent (ea), a second operand exponent (eb), and a third operand exponent (ec). Each of the operand exponents (ea, eb, and ec) has a predefined minimum value ($e_{min}$). In addition, each of the operand exponents (ea, eb, and ec) is associated with a separate significand. Each significand has a predefined number of significant bits (N1). The result of the floating-point multiply-add operation is also associated with a significand. The significand of the result also has a predetermined number of significant bits (N2). N1 is in general greater than or equal to N2.

In a first embodiment, the prediction unit 204 is structured to assert an output signal indicative of the absence of the underflow condition if at least one of the following conditions is true:

$(eb+ec-ea) \leq (-3)$ and $(ea) \geq (e_{min}+1)$; (i)

$(-2) \leq (eb+ec-ea) \leq (0)$ and $(eb+ec) \geq (e_{min}+2*N1-2+2*(N1-N2))$; (ii)

$(eb+ec-ea) = (1)$ and $(ea) \geq (e_{min}+N1-1+(N1-N2))$; (iii)

$(2) \leq (eb+ec-ea) \leq (N1-2)$ and $(ea) \geq (e_{min}-1)$; (iv)

$(N1-1) \leq (eb+ec-ea)$ and $(eb+ec) \geq (e_{min}+1)$; (v)

$(ea) \leq (e_{min}-1)$ and $(eb+ec) \geq (e_{min}+1)$. (vi)

In a second embodiment, the prediction unit 204 is structured to assert an output signal indicative of the absence of the underflow condition if at least one of the following conditions is true:

$(eb+ec-ea) \leq (-3)$ and $(ea) \geq (e_{min}+1)$; (i)

$(eb+ec-ea) = (-2)$ and $ea \geq e_{min}+(N2+T)$; (ii)

$(eb+ec) \geq e_{min}+2*(N2+T)-2$; (iii)

$(eb+ec-ea) = 1$ and $(ea) \geq e_{min}+(N2+T)-1$; (iv)

$(eb+ec-ea) \geq 2$ and $(eb+ec) \geq (e_{min}+1)$; (v)

In this second embodiment, a, b, and c are all non-zero, and may be single precision, double precision, double-extended precision, or register format normalized floating-point numbers. In these equations T=N1−N2.

For the purpose of normalizing one or more floating-point numbers, the processor 200 includes a normalizer 206. In one embodiment, the normalizer 206 shifts the position of the radix point to be immediately after an implied '1' by adjusting an associated exponent value in a well-known manner.

For the purpose of performing one or more floating-point operation on three operands, including the floating-point multiply-add operation, the processor 200 may include a floating-point hardware unit 208. The floating-point hardware unit 208 is a well-known circuit capable of quickly performing one or more predetermined floating-point multiply-add operations. However, the range of the floating-point hardware unit 208 is inherently limited by some predetermined number of bits used to represent the floating-point numbers used in the floating-point multiply-add operations.

For the purpose of performing one or more floating-point operations on three operands, including the floating-point multiply-add operation, the processor 200 may also include a floating-point software module 210. In some embodiments the floating-point software unit 210 may be capable of handling larger and/or smaller floating-point results than the floating-point hardware unit 208. However, the floating-point software unit 210 is typically slower than the floating-point hardware unit 208.

Figure 2:
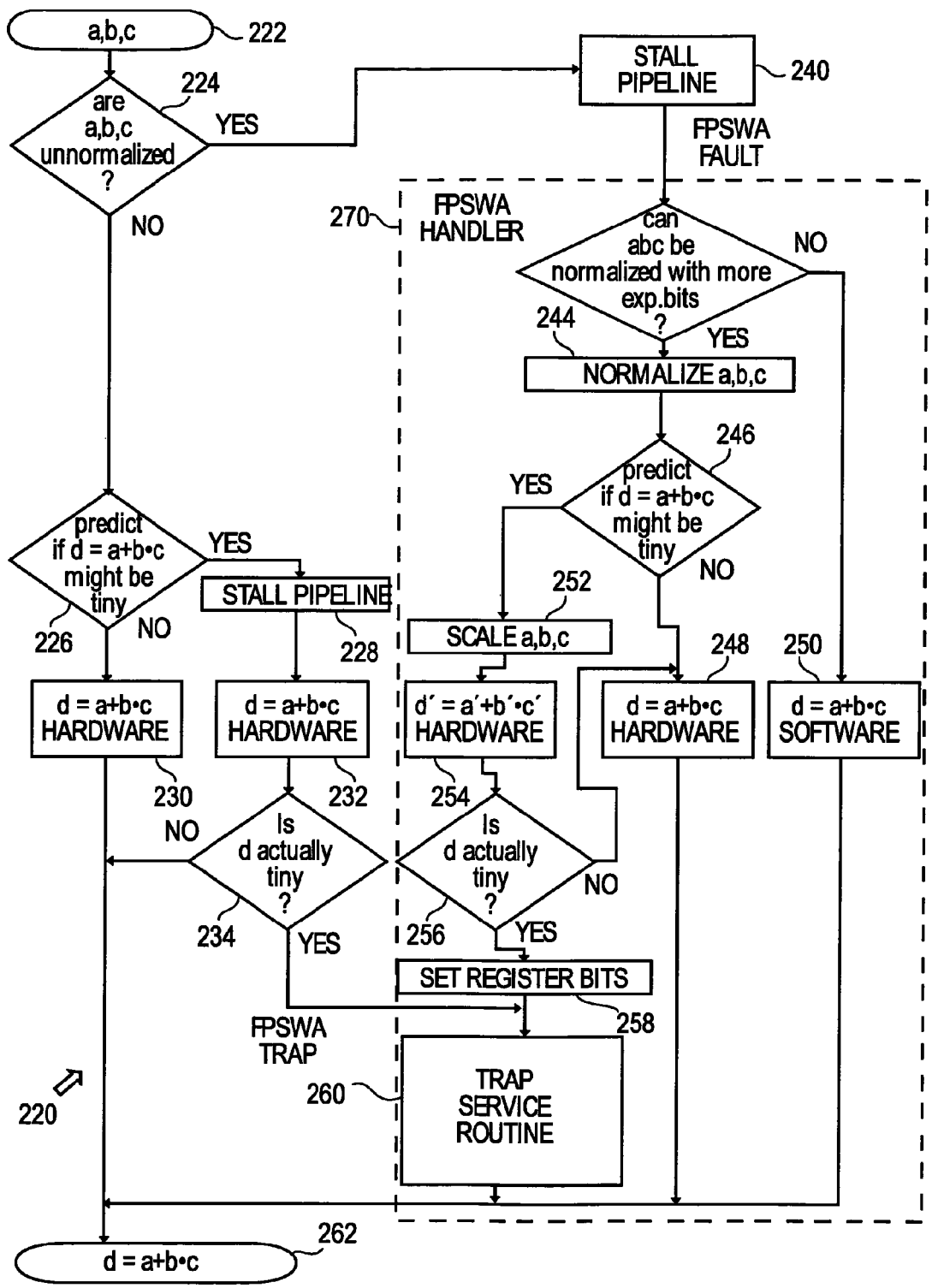
FIG. 2 is a flowchart diagram showing a method for performing a floating-point operation, according to one embodiment of the present disclosure.

Referring now to FIG. 2, a flowchart diagram showing a method for performing a floating-point operation is shown, according to one embodiment of the present disclosure. In the FIG. 2 embodiment, the floating-point operation discussed is a floating-point multiply-add operation, operating on three operands a, b, c, and giving a result d=a+b*c. In other embodiments, other floating-point operations with three operands may be used. Some of these other floating-point operations may include d=a−b*c or d=−a+b*c. In other embodiments, multiple sets of three operands may be operated upon at essentially the same time in parallel.

The FIG. 2 process 220 may begin with the inputting of the three operands a, b, c, in block 224. Then in decision block 224 it may be determined whether any of operands a, b, c are unnormalized. If none of the operands a, b, c are unnormalized, then decision block 224 exits via the NO output and the process enters determination block 226. In decision block 226, a logic determination of whether the result d of a+b*c might possibly be tiny is made. If the answer is no, then decision block 226 exits via the NO output and the calculation of d is performed by hardware in block 230. If, however, the answer is yes, then decision block 226 exits via the YES output. The pipeline may be stalled in block 228 and then the calculation of d is performed by hardware in block 232. Since there is the possibility that the result d might be tiny, in decision block 234 the hardware determines whether d is in fact tiny. If d is not in fact tiny, then the results of d=a+b*c is valid and the process exits decision block 234 via the NO output. If, however, d is in fact tiny, then this causes a floating-point software assist (FPSWA) hardware trap, and the process exits decision block 234 via the YES output. From there the FPSWA trap is serviced by a trap service routine 260 within floating-point software assist FPSWA module 270, and a software calculation of d=a+b*c is performed. FPSWA module 270 may perform the basic floating-point calculations that are defined by the processor architecture but that are not implemented in the hardware.

Returning again to decision block 224, if it is determined that at least one of a, b, c are unnormalized, then the process exits decision block 224 via the YES output. The pipeline may be stalled in block 240 and then the FPSWA module 270 may be entered at decision block 242. In decision block 242 it is determined whether a, b, c may become normalized if additional bits for the value of the exponents are made available. In one embodiment, the standard number of bits for the exponent is 15, and the system may permit the use of 17 bits in certain circumstances. If it is not possible to normalize a, b, c even with the use of the additional bits for values of the exponent, then decision block 242 exits via the NO output, and the process proceeds to calculate the value of d=a+b*c using a software floating-point library (block 250).

However, if it is possible to normalize a, b, c, then decision block 242 exits via the YES output, and the process proceeds with so normalizing a, b, c in block 244. In one embodiment, the block 244 normalization may be performed by hardware tasked by FPSWA module 270. In other embodiments, the block 244 normalization may be performed by software within FPSWA module 270. After normalizing the operands a, b, c in block 244, a determination is made in decision block 246 whether the result d=a+b*c possibly might be tiny. In one embodiment the determination of decision block 246 may be performed in hardware tasked by the FPSWA module 270, such as that hardware shown in detail in connection with FIG. 3 below. In another embodiment, the determination of decision block 246 may be performed by software within FPSWA module 270. Such software may implement the method shown in detail in connection with FIG. 4 below.

If the determination of decision block 246 is that d=a+b*c will not be tiny, then the process exits decision block 246 via the NO output and the result d=a+b*c may be calculated in hardware in block 248. If, however, the determination of decision block 246 is that d=a+b*c possibly might be tiny, then the process exits decision block 246 via the NO YES output. Recall that in decision block 234, it was possible to simply proceed to execute d=a+b*c in hardware and use a hardware trap if d was found to be actually tiny subsequent to calculation. However, this simple method should not be used within the FPSWA module 270, which is itself an exception handler. If a hardware fault is generated within an exception handler, generally the system might experience a system panic.

Therefore, in one embodiment, if it is predicted that the result d=a+b*c possibly might be tiny, then in block 252 the operands a, b, c, are scaled to form scaled operands a', b', c'. Differing scale factors may be used depending upon circumstances. When either b or c are zero, and a is not zero, then the scale factor of one is used and the scaling may set a'=a, b'=b, and c'=c. If a is zero and neither b nor c are zero, then the scaling may set a'=a, b'=b*$2^{-eb}$, and c'=c*$2^{-ec}$. In case neither a, b, nor c are zero, then the scaling may set a'=a*$2^{-ea}$, said b=b*$2^{-eb+\lfloor(eb+ec+ea)/2\rfloor}$, and said c=c*$2^{-ec+\lceil(eb+ec-ea)/2\rceil}$. The notation used here uses the symbol $\lfloor X \rfloor$ to represent a "greatest integer not greater than X" or "floor of X", and uses the symbol $\lceil X \rceil$ to represent a "least integer not less than X" or "ceiling of X". The scaling performed in block 252 may in one embodiment be performed by hardware tasked by the FPSWA module 270, or may in another embodiment be performed by a software module, such as scaling module 520 discussed in connection with FIG. 5 below.

The scaled values of the operands a', b', c' have utility in determining whether d=a+b*c is actually tiny or not. The first utility is that the scaled operands may safely be used to calculate in hardware the operation with result d'=a'+b'*c'. Here "safely" means that there should be no hardware trap upon the calculation in hardware. So in block 254 the process tasks the floating-point hardware to calculate the scaled value of d, d'=a'+b'*c'. The second utility is that the safely-calculated value of d' may be used to determine whether or not the non-scaled d is actually tiny without the risk or delay of actually calculating d.

The determination of whether or not d is actually tiny by using the calculated value of d' may be performed in decision block 256. A series of cases may be used corresponding to the cases used in the scaling of block 252. For the case when either b or c are zero, and a is not zero, then d will actually be tiny when ed'<$e_{min}$. For the case when a is zero but neither b nor c are zero, then d will actually be tiny when ed'<$e_{min}$–eb–ec. Finally, for the case when neither a, b, nor c are zero, then d will actually be tiny when ed'<$e_{min}$–ea.

If it is determined in decision block 256 that d will not actually be tiny, then it is safe to calculate d=a+b*c in hardware. So in this case decision block 256 exits via the NO output, and the process may proceed to calculate the value of d=a+b*c using the floating-point hardware (block 248). If, however, it is determined in decision block 256 that d will actually be tiny, then it is not safe to calculate d=a+b*c in hardware. Therefore in this case decision block 256 exits via the YES output, and the process may proceed to calculate the value of d=a+b*c using floating-point software routines.

In one embodiment, the floating-point software routine used may be the trap service routine 260 normally used when hardware traps are found in decision block 234. However, the use of decision block 256 has not generated an actual hardware trap. An actual hardware trap may automatically write values into a special register, which may be examined by the trap service routine 260. In one embodiment, the special register may be an Interruption Status Register ISR, and the hardware trap may set the Underflow "U" bit, the Inexact "I" bit, and the fpa bit of the ISR depending upon circumstances of the trap. The fpa bit is set to "1" when the magnitude of the delivered result is greater than the magnitude of the infinitely precise result. (This may happen if the significand is incremented during rounding, or when a larger pre-determined value is substituted for the computed result.) Since trap service routine 260 expects these bits to be set, in block 258 the software must set them in a manner that trap service routine 260 expects. Then in trap service routine 260 the value of d=a+b*c may be calculated in floating-point software.

Figure 3:
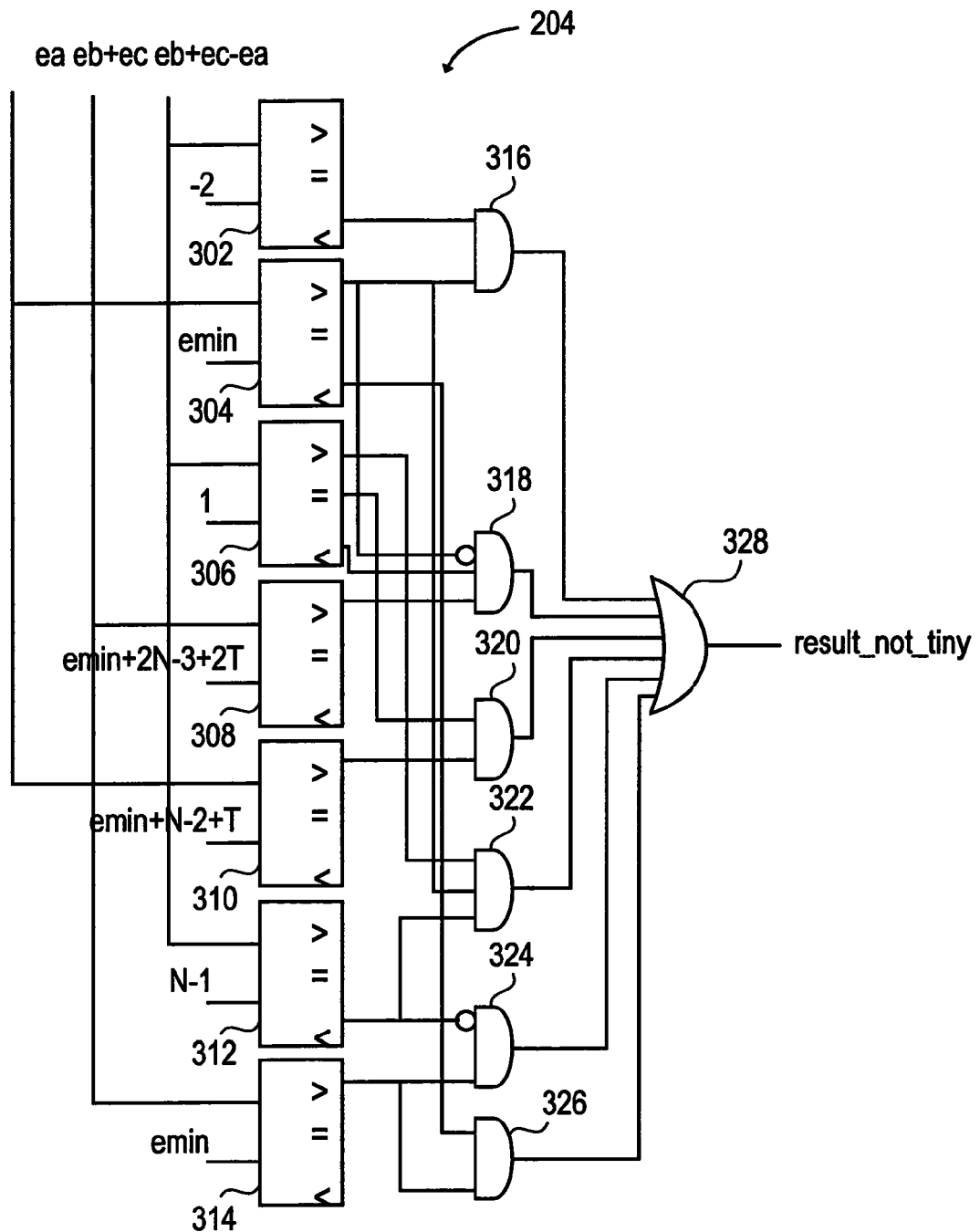
FIG. 3 is a schematic diagram of a hardware logic circuit for predicting an underflow condition associated with a floating-point operation, according to one embodiment of the present disclosure.

Referring now to FIG. 3, a schematic diagram of a logic circuit for predicting an underflow condition associated with a floating-point operation is shown, according to one embodiment. The prediction unit 204 may be a logic circuit for predicting a possible underflow condition associated with a floating-point operation on three operands, including the floating-point multiply-add operation. In the discussion of FIG. 3 only the floating-point multiply-add operation is specifically discussed, but in other embodiments other floating-point operations such as a−b*c or −a+b*c may be used. In this embodiment, the prediction unit 204 may include seven comparators 302-314, six logic-AND gates 316-326, and one logic-OR gate 328. Of course, a person of ordinary skill in the art will readily appreciate that many different circuits could be employed to achieve equivalent results. The logic circuit shown in FIG. 3 generally determines the logical outcome of the set of equations of the first embodiment discussed above in connection with FIG. 1. Similar logic circuits could be created that would generally determine the logical outcome of the set of equations of the second embodiment discussed above in connection with FIG. 1.

As discussed above, the floating-point multiply-add operation operates on three floating-point numbers (e.g., a+b*c). In such an instance, the operation includes a first operand exponent (ea), a second operand exponent (eb), and a third operand exponent (ec). Each of the operand exponents (ea, eb, and ec) has a predefined minimum value ($e_{min}$). In addition, each of the operand exponents (ea, eb, and ec) is associated with a separate significand. Each significand has a predefined number of significant bits (N1). The result of the floating-point multiply-add operation is also associated with a significand. The significand of the result also has a predetermined number of significant bits (N2).

Each of these numbers (ea, eb, ec, $e_{min}$, N1, and N2) as well as mathematical combinations of these numbers (e.g., eb+ec) may be available to the prediction unit 204 in a well-known manner. For example, a number may be retrieved from a memory and placed on a system interconnect, which may be a system data bus. Similarly, one or more numbers may be retrieved from a memory, combined mathematically by hardware and/or software, and the result placed on a system interconnect or system bus. For the sake of clarity, in FIG. 3 the symbol T is used when T=N1−N2.

Turning to the prediction unit 204 as illustrated in FIG. 3, the first logic-AND gate 316 may be electrically connected to the first comparator 302 and the second comparator 304. The first comparator 302 and the second comparator 304 may be electrically connected to data busses representing numbers. The arrangement of the first logic-AND gate 316, the first comparator 302, the second comparator 304, and the data busses is structured to produce a predetermined output signal from the first logic-AND gate 316 if (eb+ec−ea)<=(−3) and (ea)>=($e_{min}$+1).

The second logic-AND gate 318 may be electrically connected to the third comparator 306 and the fourth comparator 308. The third comparator 306 and the fourth comparator 308 may be electrically connected to data busses representing numbers. The arrangement of the second logic-AND gate 318, the third comparator 306, the fourth comparator 308, and the data busses is structured to produce a predetermined output signal from the second logic-AND gate 318 if (−2)<=(eb+ec−ea)<=(0) and (eb+ec)>=($e_{min}$+2*N1−2+2*(N1−N2)).

The third logic-AND gate 320 may be electrically connected to the third comparator 306 and the fifth comparator 310. The third comparator 306 and the fifth comparator 310 may be electrically connected to data busses representing numbers. The arrangement of the third logic-AND gate 320, the third comparator 306, the fifth comparator 310, and the data busses is structured to produce a predetermined output signal from the third logic-AND gate 320 if (eb+ec−ea)=(1) and (ea)>=($e_{min}$+N1−1+(−N1−N2)).

The fourth logic-AND gate 322 is electrically connected to the third comparator 306 and the sixth comparator 312. The third comparator 306 and the sixth comparator 312 may be electrically connected to data busses representing numbers. The arrangement of the fourth logic-AND gate 322, the third comparator 306, the sixth comparator 312, and the data busses is structured to produce a predetermined output signal from the fourth logic-AND gate 322 if (2)<=(eb+ec−ea)<=(N1−2) and (ea)>=($e_{min}$−1).

The fifth logic-AND gate 324 may be electrically connected to the sixth comparator 312 and the seventh comparator 314. The sixth comparator 312 and the seventh comparator 314 may be electrically connected to data busses representing numbers. The arrangement of the fifth logic-AND gate 324, the sixth comparator 312, the seventh comparator 314, and the data busses is structured to produce a predetermined output signal from the fifth logic-AND gate 324 if (N1−1)<=(eb+ec−ea) and (eb+ec)>=($e_{min}$+1).

The sixth logic-AND gate 326 may be electrically connected to the second comparator 304 and the seventh comparator 314. The second comparator 304 and the seventh comparator 314 may be electrically connected to data busses representing numbers. The arrangement of the sixth logic-AND gate 326, the second comparator 304, the seventh comparator 314, and the data busses is structured to produce a predetermined output signal from the sixth logic-AND gate 326 if (ea)<=($e_{min}$−1) and (eb+ec)>=($e_{min}$+1).

The output of each of the logic-AND gates 316-326 may be fed into the logic-OR gate 328. As a result, the output of the logic-OR gate 328 may predict the presence of a possible underflow condition or the absence of the underflow condition associated with a floating-point multiply-add operation represented by the numbers (ea, eb, ec, $e_{min}$, N1, and N2).

The prediction produced by the prediction unit 204 is "pessimistic" in that it predicts that an underflow condition will result in all situations where an underflow condition will result. However, the prediction unit 204 also predicts that an underflow condition might result in some situations where an underflow condition will not result. Hence it may be said that the prediction unit 204 may predict whether or not a result d=a+b*c might be tiny.

Figure 4:
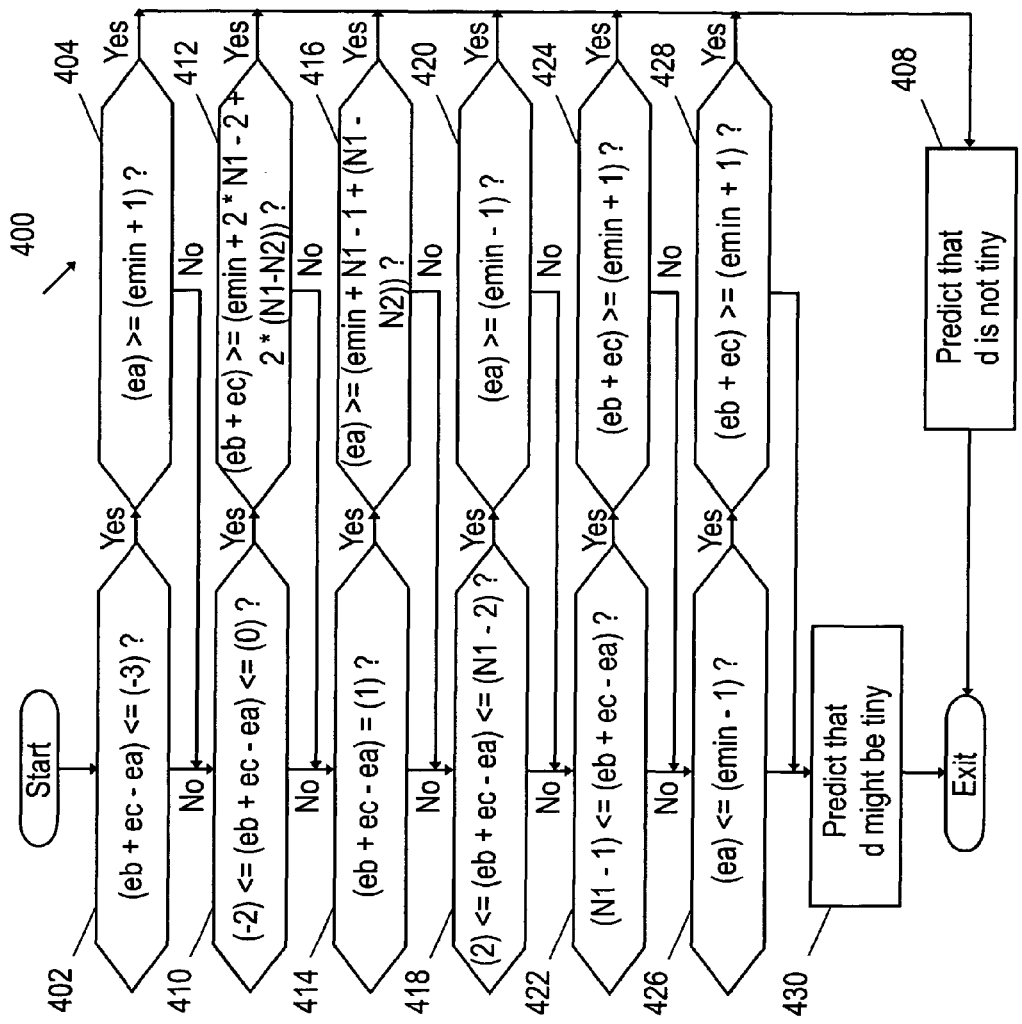
FIG. 4 is a flowchart diagram showing a method for predicting an underflow condition associated with a floating-point operation, according to one embodiment of the present disclosure.

Referring now to FIG. 4, a flowchart diagram of a method for predicting an underflow condition associated with a floating-point operation is shown, according to one embodiment. In one embodiment, the process 400 is embodied in a software program that may be stored in a memory and executed by the processor 200. However, some or all of the components of the process 400 may be performed by another device. Although the process 400 is described with reference to the flowchart illustrated in FIG. 4, a person of ordinary skill in the art will readily appreciate that many other methods of performing the acts associated with process 400 may be used. For example, the order of many of the blocks may optionally be changed. In addition, many of the blocks described are optional. The flowchart diagram shown in FIG. 4 generally determines the logical outcome of the set of equations of the first embodiment discussed above in connection with FIG. 1. A similar flowchart diagram could be created that would generally determine the logical outcome of the set of equations of the second embodiment discussed above in connection with FIG. 1.

Generally, the process 400 may permit the processor 200 to predict an underflow condition associated with a floating-point multiply-add operation in certain circumstances. Again, the prediction may be termed "pessimistic" in that it may predict that an underflow condition might result in all situations where an underflow condition will result, but also predicts that an underflow condition might result in some situations where an underflow condition will not result.

Although the tests may be performed in any order, the process 400 depicted in FIG. 4 may begin by the processor

200 testing if (eb+ec−ea)<=(−3) (block 402). If the test in block 402 produces a true result, the process 400 then has processor 200 test if (ea)>=($e_{min}$+1) (block 404). If both block 402 and block 404 produce a true result, the process 400 causes the processor 200 to predict that the result d=a+b*c is not tiny (block 408).

If needed, the process 400 may also cause the processor 200 to test if (−2)<=(eb+ec−ea)<=(0) (block 410). If the test in block 410 produces a true result, the process 400 may cause the processor 200 to test if (eb+ec)>=($e_{min}$+2*N1−2+2*(N1−N2)) (block 412). If both block 410 and block 412 produce a true result, the process 400 may cause the processor 200 to predict that the result d=a+b*c is not tiny (block 408).

If needed, the process 400 also may cause the processor 200 to test if (eb+ec−ea)=(1) (block 414). If the test in block 414 produces a true result, the process 400 may cause the processor 200 to test if (ea)>=($e_{min}$+N1−1+(N1−N2)) (block 416). If both block 414 and block 416 produce a true result, the process 400 causes the processor 200 to predict that the result d=a+b*c is not tiny (block 408).

If needed, the process 400 also may cause the processor 200 to test if (2)<=(eb+ec−ea) (block 418). If the test in block 418 produces a true result, the process 400 may cause the processor 200 to test if (N1−2) and (ea)>=($e_{min}$−1) (block 420). If both block 418 and block 420 produce a true result, the process 400 causes the processor 200 to predict that the result d=a+b*c is not tiny (block 408).

If needed, the process 400 also may cause the processor 200 to test if (N1−1)<=(eb+ec−ea) (block 422). If the test in block 422 produces a true result, the process 400 may cause the processor 200 to test if (eb+ec)>=($e_{min}$+1) (block 424). If both block 422 and block 424 produce a true result, the process 400 causes the processor 200 to predict that the result d=a+b*c is not tiny (block 408).

If needed, the process 400 also may cause the processor 200 to test if (ea)<=($e_{min}$−1) (block 426). If the test in block 426 produces a true result, the process 400 may cause the processor 200 to test if (eb+ec)>=($e_{min}$+1) (block 428). If both block 426 and block 428 produce a true result, the process 400 causes the processor 200 to predict that the result d=a+b*c is not tiny (block 408).

If an underflow condition is predicted by the prediction unit 204 (i.e., if the process flow continues to block 430), the process 400 has predicted that the result d=a+b*c might possibly be tiny (block 430). However, in some cases a prediction that d might be tiny (block 430) may subsequently be found to have been a misprediction. A true determination of whether d is tiny may determine that d is in fact not tiny.

Figure 5:
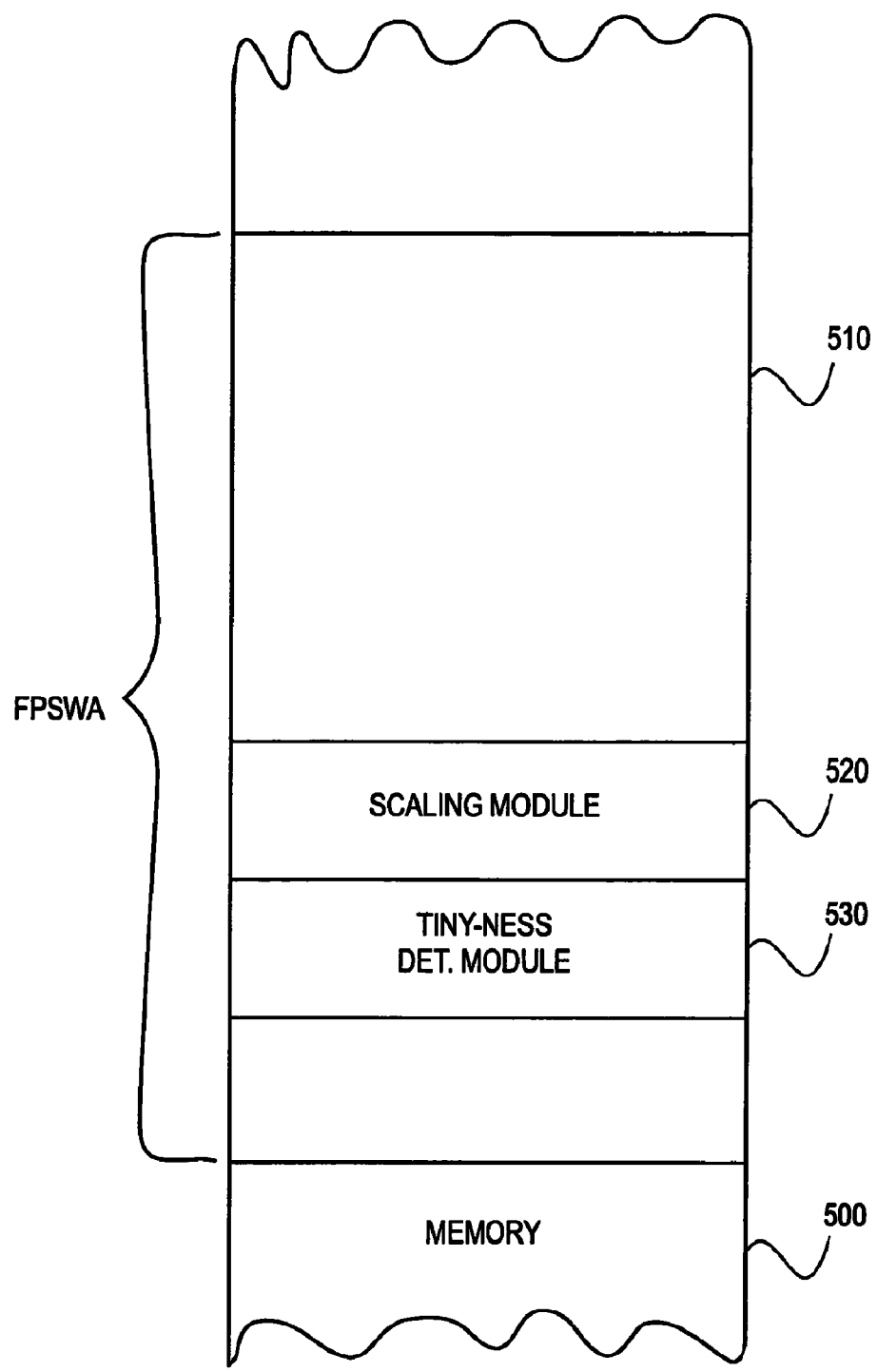
FIG. 5 is a module diagram showing software modules in a floating-point software assist module, according to one embodiment of the present disclosure.

Referring now to FIG. 5, a module diagram of software modules in a floating-point software assist module 510 is shown, according to one embodiment of the present disclosure. Floating-point software assist module 510 may be resident in memory 500, which in some embodiments may be system memory, within a basic input/output system (BIOS) in non-volatile memory, or in a cache memory within a processor. In other embodiments, floating-point software assist module 510 may be stored in a computer-readable media such as a disk drive. In one embodiment, floating-point software assist module 510 may be included within the floating-point software module 210 of FIG. 2. In another embodiment, floating-point software assist module 510 may be the floating-point software assist module 270 of FIG. 2.

Two component modules, scaling module 520 and tiny-ness determination module 530, are shown within floating-point software assist module 510. However, there may be many other modules (not shown) that may be component modules of floating-point software assist module 510. In one embodiment, scaling module 520 may correspond to the process component block 252 of FIG. 2, and tiny-ness determination module 530 may correspond to the process component block 256 of FIG. 2.

Figure 6:
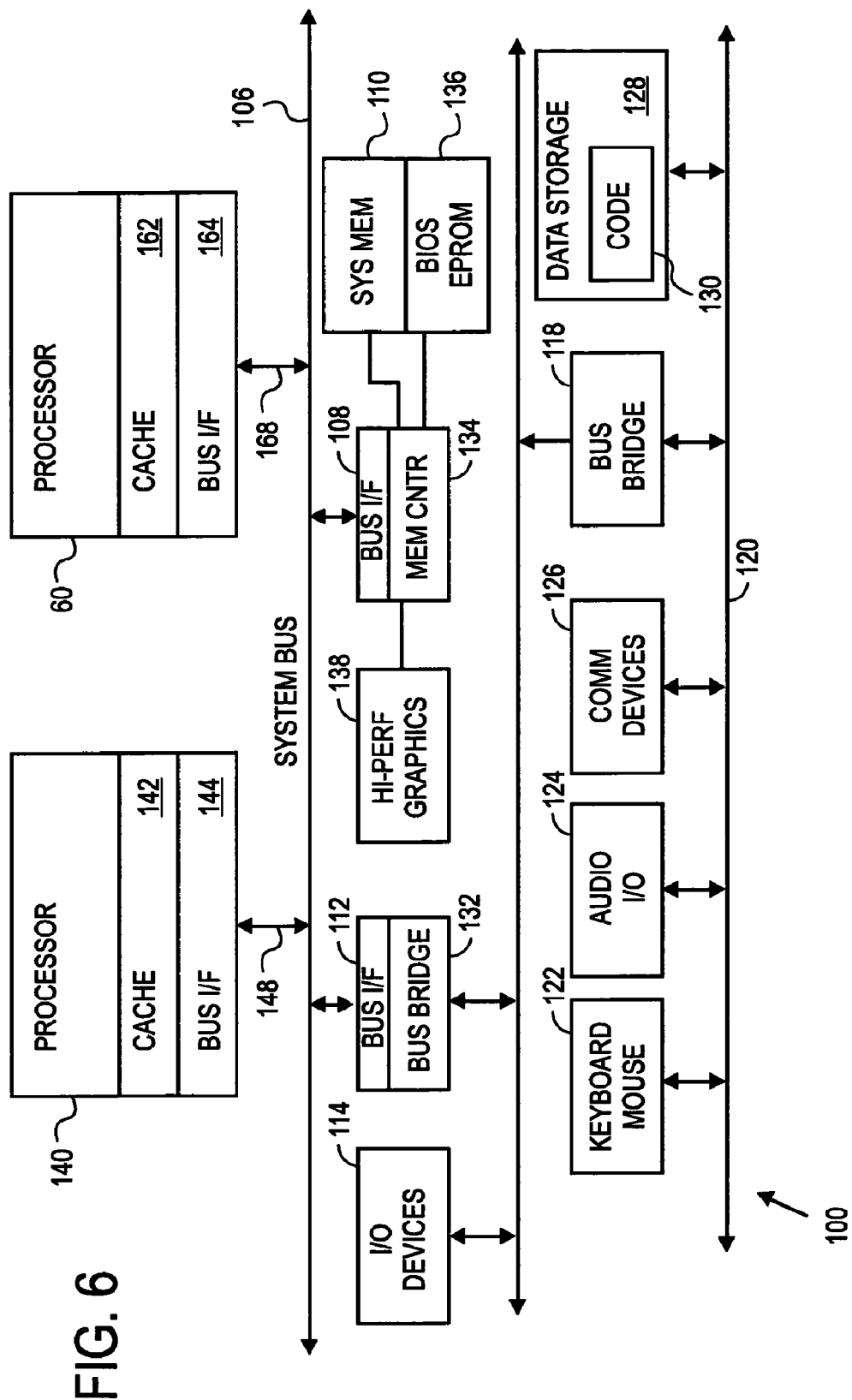
FIG. 6 is a schematic diagram of a multiprocessor system, according to one embodiment.

Referring now to FIG. 6, a schematic diagram of a multi-processor system 100 is shown, according to one embodiment. The FIG. 6 system may include several processors of which only two, processors 140, 160 are shown for clarity. Processors 140, 160 may include level one caches 142, 162. In one embodiment, processors 140, 160 may be the processor 200 of FIG. 1. The FIG. 6 multiprocessor system 100 may have several functions connected via bus interfaces 144, 164, 112, 108 with a system bus 106. In one embodiment, system bus 106 may be the front side bus (FSB) utilized with Itanium® class microprocessors manufactured by Intel® Corporation. A general name for a function connected via a bus interface with a system bus is an "agent". Examples of agents are processors 140, 160, bus bridge 132, and memory controller 134. In some embodiments memory controller 134 and bus bridge 132 may collectively be referred to as a chipset. In some embodiments, functions of a chipset may be divided among physical chips differently than as shown in the FIG. 6 embodiment.

Memory controller 134 may permit processors 140, 160 to read and write from system memory 110 and from a basic input/output system (BIOS) erasable programmable read-only memory (EPROM) 136. In some embodiments BIOS EPROM 136 may utilize flash memory. Memory controller 134 may include a bus interface 108 to permit memory read and write data to be carried to and from bus agents on system bus 106. Memory controller 134 may also connect with a high-performance graphics circuit 138 across a high-performance graphics interface 139. In certain embodiments the high-performance graphics interface 139 may be an advanced graphics port AGP interface, or an AGP interface operating at multiple speeds such as 4×AGP or 8×AGP. Memory controller 134 may direct read data from system memory 110 to the high-performance graphics circuit 138 across high-performance graphics interface 139.

Bus bridge 132 may permit data exchanges between system bus 106 and bus 116, which may in some embodiments be a industry standard architecture (ISA) bus or a peripheral component interconnect (PCI) bus. There may be various input/output I/O devices 114 on the bus 116, including in some embodiments low performance graphics controllers, video controllers, and networking controllers. Another bus bridge 118 may in some embodiments be used to permit data exchanges between bus 116 and bus 120. Bus 120 may in some embodiments be a small computer system interface (SCSI) bus, an integrated drive electronics (IDE) bus, or a universal serial bus (USB) bus. Additional I/O devices may be connected with bus 120. These may include keyboard and cursor control devices 122, including mice, audio I/O 124, communications devices 126, including modems and network interfaces, and data storage devices 128. Software code 130 may be stored on data storage device 128. In one embodiment, software code 130 may be the floating-point software assist module 510 of FIG. 5. In some embodiments, data storage device 128 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
operating a plurality of comparator circuits and a plurality of logic devices coupled to the plurality of comparator circuits to determine whether performing a floating-point operation using a floating-point hardware unit will generate an underflow condition, the operating of the plurality of comparator circuits and the logic devices comprising:
inputting a value to at least some of the plurality of comparator circuits;
performing comparison operations by at least some of the comparator circuits based on the value;
outputting a plurality of logic outputs via the plurality of logic devices, the plurality of logic outputs based on the comparison operations; and
outputting an underflow indicator based on the plurality of logic outputs, the underflow indicator indicative of whether performing the floating-point operation using the floating-point hardware unit will generate the underflow condition.

2. A method as defined in claim 1, wherein the floating-point operation is a floating-point multiply-add operation.

3. A method as defined in claim 1, wherein the value is a multiply-add operation result value determined by adding a first floating-point number exponent value to a second floating-point number exponent value to generate a sum value and subtracting a third floating-point number exponent value from the sum value.

4. A method as defined in claim 1, further comprising performing second comparison operations based on a plurality of predefined minimum exponent values, each of the predefined minimum exponent values associated with a respective one of a plurality of input floating-point operand values, at least some of the plurality of logic outputs based on the second comparison operations.

5. A method as defined in claim 1, further comprising performing second comparison operations based on a plurality of predefined numbers of significand bits, each of the predefined numbers of significand bits associated with a respective one of a plurality of input floating-point operand values, at least some of the plurality of logic outputs based on the second comparison operations.

6. A method as defined in claim 1, further comprising causing the floating-point hardware unit to perform the floating-point operation when the underflow indicator is indicative of the floating-point hardware unit not generating the underflow condition.

7. An apparatus, comprising:
a plurality of comparator circuits, each to receive a value and perform a comparison operation based on the value;
a plurality of first stage logic devices coupled to the comparator circuits to output a plurality of logic outputs indicative of the comparison operations; and
a second stage logic device coupled to the plurality of first stage logic devices to output an underflow indicator based on the plurality of logic outputs, the underflow indicator indicative of whether performing a floating-point operation using a floating-point hardware unit will generate an underflow condition.

8. An apparatus as defined in claim 7, wherein the floating-point operation is a floating-point multiply-add operation.

9. An apparatus as defined in claim 7, wherein the value is a multiply-add operation result value determined by adding a first floating-point number exponent value to a second floating-point number exponent value to generate a sum value and subtracting a third floating-point number exponent value from the sum value.

10. An apparatus as defined in claim 7, further comprising second comparator circuits to perform second comparison operations based on a plurality of predefined minimum exponent values, each of the predefined minimum exponent values associated with a respective one of a plurality of input floating-point operand values, wherein at least some of the plurality of logic outputs are based on the second comparison operations.

11. An apparatus as defined in claim 7, further comprising second comparator circuits to perform second comparison operations based on a plurality of predefined numbers of significand bits, each of the predefined numbers of significand bits associated with a respective one of a plurality of input floating-point operand values, wherein at least some of the plurality of logic outputs are based on the second comparison operations.

12. An apparatus as defined in claim 7, further comprising the floating-point hardware unit to perform the floating-point operation when the underflow indicator is indicative of the floating-point hardware unit not generating the underflow condition.

13. A computer readable medium having instructions stored thereon that, when executed, cause a machine to:
receive a value;
perform comparison operations based on the value;
output a plurality of logic output values based on the plurality of comparison operations; and
output an underflow indicator based on the plurality of logic output values, the underflow indicator indicative of whether performing a floating-point operation using a floating-point hardware unit will generate an underflow condition.

14. A computer readable medium as defined in claim 13, wherein the floating-point operation is a floating-point multiply-add operation.

15. A computer readable medium as defined in claim 13 having instructions stored thereon that, when executed, cause the machine to determine the value by adding a first floating-point number exponent value to a second floating-point number exponent value to generate a sum value and subtracting a third floating-point number exponent value from the sum value.

16. A computer readable medium as defined in claim 13 having instructions stored thereon that, when executed, cause the machine to perform second comparison operations based on a plurality of predefined minimum exponent values, each of the predefined minimum exponent values associated with a respective one of a plurality of input floating-point operand values, wherein at least some of the plurality of logic output values are based on the second comparison operations.

17. A computer readable medium as defined in claim 13 having instructions stored thereon that, when executed, cause the machine to perform second comparison operations based on a plurality of predefined numbers of significand bits, each of the predefined numbers of significand bits associated with a respective one of a plurality of input floating-point operand values, wherein at least some of the plurality of logic output values are based on the second comparison operations.

18. A computer readable medium as defined in claim 13 having instructions stored thereon that, when executed, cause the machine to cause the floating-point hardware unit to perform the floating-point operation when the underflow indicator is indicative of the floating-point hardware unit not generating the underflow condition.

19. A method, comprising:
predicting whether performing a floating-point operation using a floating-point hardware unit will generate an underflow condition;
operating the floating-point hardware unit to determine a result value using the floating-point operation;
determining whether the result value generates the underflow condition; and
in response to determining that the result value generates the underflow condition, operating a floating-point software unit to determine a second result value.

20. A method as defined in claim 19, wherein the floating-point operation is a floating-point multiply-add operation.

21. A method as defined in claim 19, further comprising prior to predicting whether performing the floating-point operation using the floating-point hardware unit will generate the underflow condition, stalling a pipeline of a processor when operand values associated with the floating-point operation are unnormalized.

22. A method as defined in claim 21, further comprising, when the operand values associated with the floating-point operation are unnormalized, normalizing the operand values to include additional floating-point exponent bits prior to predicting whether performing the floating-point operation using the floating-point hardware unit will generate the underflow condition.

23. A method as defined in claim 19, wherein the result value is a scaled value determined based on operating the floating-point hardware unit on scaled operand values.

24. A method as defined in claim 19, further comprising, in response to determining that the result value generates the underflow condition, setting an underflow bit and an inexact bit in a status register prior to operating the floating-point software unit to determine the second result value.

25. A method as defined in claim 19, wherein the predicting of whether performing the floating-point operation using the floating-point hardware unit will generate the underflow condition comprises performing the predicting via a hardware prediction circuit comprising a plurality of comparator circuits coupled to a plurality of logic-AND gates.

26. A system, comprising:
a floating-point hardware unit;
a processor; and
a memory having instructions stored thereon that, when executed, cause the processor to:
predict whether performing a floating-point operation using the floating-point hardware unit will generate an underflow condition;
cause the floating-point hardware unit to determine a result value using the floating-point operation;
determine whether the result value generates the underflow condition; and
in response to determining that the result value generates the underflow condition, operate a floating-point software unit to determine a second result value.

27. A system as defined in claim 26, wherein the floating-point operation is a floating-point multiply-add operation.

28. A system as defined in claim 26, wherein the instructions stored on the memory, when executed, cause the processor to, prior to predicting whether performing the floating-point operation using the floating-point hardware unit will generate the underflow condition, stall a pipeline of the processor when operand values associated with the floating-point operation are unnormalized.

29. A system as defined in claim 28, wherein the instructions stored on the memory, when executed, cause the processor to, when the operand values associated with the floating-point operation are unnormalized, normalize the operand values to include additional floating-point exponent bits prior to predicting whether performing the floating-point operation using the floating-point hardware unit will generate the underflow condition.

30. A system as defined in claim 26, wherein the result value is a scaled value determined based on operating the floating-point hardware unit on scaled operand values.

31. A system as defined in claim 26, wherein the instructions stored on the memory, when executed, cause the processor to, in response to determining that the result value generates the underflow condition, set an underflow bit and an inexact bit in a status register prior to operating the floating-point software unit to determine the second result value.

32. A system as defined in claim 26, further comprising a hardware prediction circuit comprising a plurality of comparator circuits coupled to a plurality of logic-AND gates, wherein the instructions stored on the memory, when executed, cause the processor to cause the hardware prediction circuit to perform the predicting of whether performing the floating-point operation using the floating-point hardware unit will generate the underflow condition.

33. A computer readable medium having instructions stored thereon that, when executed, cause a machine to:
predict whether performing a floating-point operation using a floating-point hardware unit will generate an underflow condition;
cause the floating-point hardware unit to determine a result value using the floating-point operation;
determine whether the result value generates the underflow condition; and
in response to determining that the result value generates the underflow condition, operate a floating-point software unit to determine a second result value.

34. A computer readable medium as defined in claim 33, wherein the floating-point operation is a floating-point multiply-add operation.

35. A computer readable medium as defined in claim 33 having instructions stored thereon that, when executed, cause the machine to, prior to predicting whether performing the floating-point operation using the floating-point hardware unit will generate the underflow condition, stall a pipeline of a processor when operand values associated with the floating-point operation are unnormalized.

36. A computer readable medium as defined in claim 35 having instructions stored thereon that, when executed, cause the machine to, when the operand values associated with the floating-point operation are unnormalized, normalize the operand values to include additional floating-point exponent bits prior to predicting whether performing the floating-point operation using the floating-point hardware unit will generate the underflow condition.

37. A computer readable medium as defined in claim 33, wherein the result value is a scaled value determined based on operating the floating-point hardware unit on scaled operand values.

38. A computer readable medium as defined in claim 33 having instructions stored thereon that, when executed, cause the machine to, in response to determining that the result value generates the underflow condition, set an underflow bit and an inexact bit in a status register prior to operating the floating-point software unit to determine the second result value.

* * * * *